United States Patent Office 2,885,102
Patented May 5, 1959

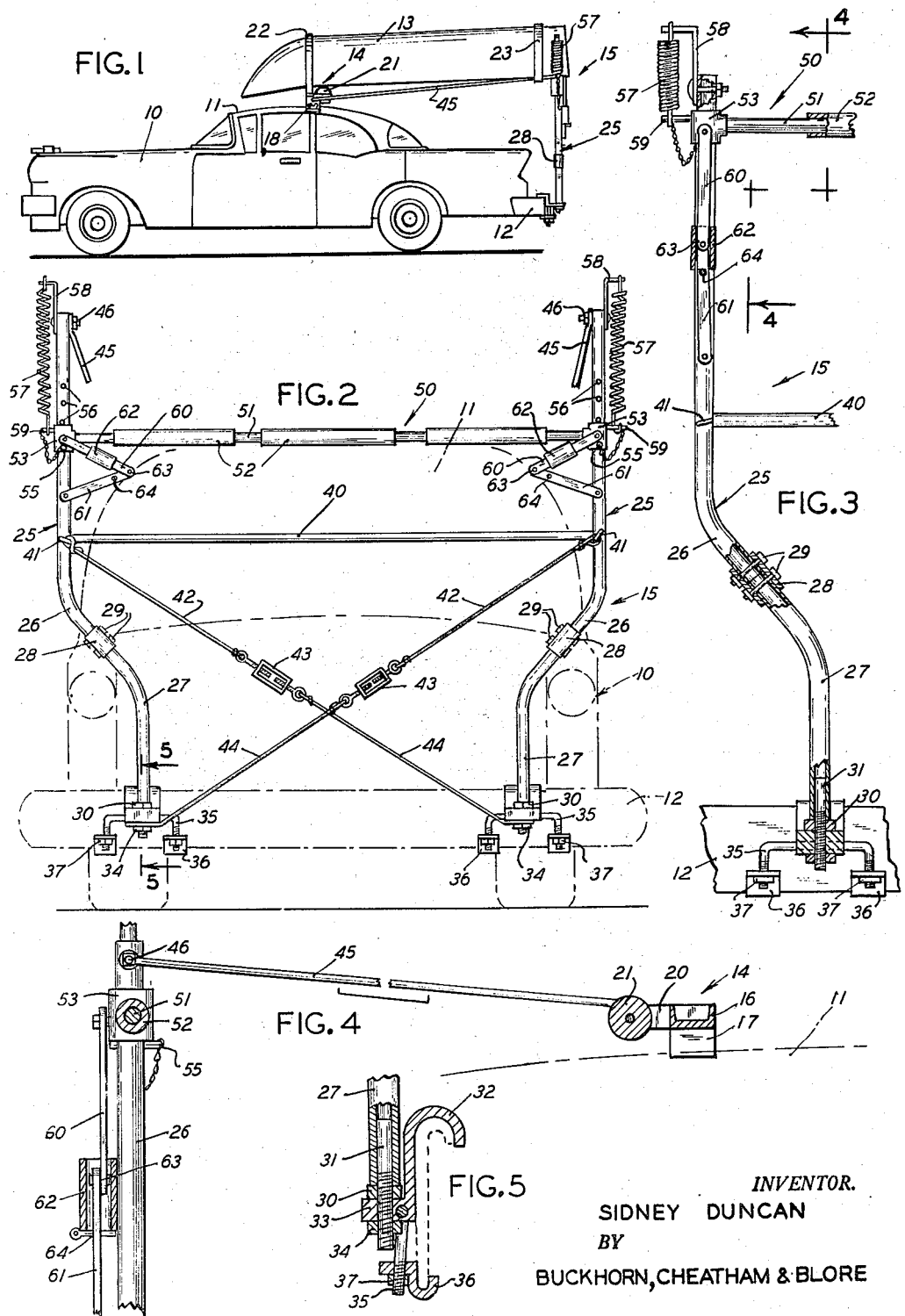

2,885,102

CAR TOP BOAT CARRIER AND LOADER

Sidney Duncan, Springfield, Oreg.

Application September 16, 1957, Serial No. 684,184

7 Claims. (Cl. 214—450)

The present invention comprises an improvement in car top boat carriers comprising means to facilitate the loading of the boat on the car top, or the unloading thereof from the car top. The present invention comprises boat supporting means, including a frame adapted to be mounted at one end of a vehicle, preferably the rear end thereof, which frame comprises a pair of upright posts supporting a vertically movable, transverse roller bar. The object of the present invention is to provide means whereby the transverse roller bar may be held at a lowered position to facilitate movement of the boat upwardly over the car top, and which may be held at a raised position for transporting the boat in level condition.

A further object of the present invention is to provide a car top boat carrier and loader of the foregoing type which may be dismounted and conveniently stored.

The foregoing and other objects and advantages of the present invention will be more readily apparent from inspection of the following specification taken in connection with the accompanying drawings wherein like numerals refer to like parts throughout.

In the drawings,

Fig. 1 is a view in side elevation of an automobile having the present invention mounted thereon, and a boat supported thereby;

Fig. 2 is a rear elevation on an enlarged scale illustrating the invention;

Fig. 3 is a partial rear elevation, partially broken away, illustrating details of the present invention;

Fig. 4 is a vertical section taken substantially along line 4—4 of Fig. 3; and

Fig. 5 is a vertical section on an enlarged scale taken substantially along line 5—5 of Fig. 2.

The invention is herein illustrated in association with an automobile 10 having a top 11 and a rear bumper 12. A boat 13 may be transported upon the vehicle by the means of the present invention, which includes a forward support generally indicated at 14 and a frame generally indicated at 15 which is mounted upon one end of the vehicle, preferably the rear end. The forward support comprises a transverse bar 16 having suitable mounting legs 17 at each end adapted to be secured to the car top in any convenient manner, such as by means of bolts and thumbscrews 18 or by any other suitable clamping means. The bar 16 is preferably provided with rearwardly extending arms 20 at its opposite ends supporting a transverse roller 21 upon which the bow of the boat may be rested. Suitable means, such as a strap 22 associated with the forward support and a strap 23 adjacent the frame 15, may be provided to tie the boat in carrying position.

The frame 15 comprises a pair of upright posts 25 respectively adjacent the sides of the vehicle, preferably at the rear corners thereof. Each post preferably comprises an upper part 26 and a lower part 27 connected together by a sleeve 28 and bolts 29 whereby the post may be disjointed for storage. Each post is preferably reversely curved on opposite sides of the sleeve 28 in order that the lower portion will clear the rear lights of the vehicle and be engaged to the bumper bar inwardly from its curved ends, and in order that the vertical upper portions thereof may be spaced apart to accommodate wide boats. The parts 26 and 27 are preferably sections of pipe suitably bent. A nut 30 is welded to the lower end of the portion 27 and a stud 31 is threaded into the pipe and extends a substantial distance into the lower end of the portion 27, so that the effective projecting length of the stud may be adjusted.

A suitable bumper clamp of any desired form may be engaged with the stud 31. The form of clamp herein illustrated comprises an upwardly projecting J-shaped member 32 adapted to hook over the top of the bumper bar and having a rearwardly projecting shelf 33 upon which the nut 30 rests, the shelf being provided with a vertical bore through which the stud 31 projects. A nut 34 is threaded onto the projecting end of the stud and tightened against the lower surface of the shelf 33 to hold the stud in position. A U-bolt 35 is pivotally mounted in a transverse bore in the inner portion of the shelf 33, each end of the U-bolt supporting a J-shaped member 36 adapted to embrace the lower edge of the bumper bar. The oppositely facing members 32 and 36 are drawn tight by nuts 37 engaging the ends of the U-bolts.

When the posts 25 have been mounted upon the bumper bar they are laterally braced by means of a transverse rod 40 extending between the upper portions 26 at a considerable distance below the upper extremities thereof, the bar 40 being provided with longitudinally projecting end pins (not shown) which are inserted in inwardly facing openings in the portions 26. Each post carries an eye 41 adjacent the end of the bar 40 in which is engaged a steel cable 42 connected to one screw eye of a turnbuckle 43. The other screw eye of the turnbuckle is connected to a steel cable 44 having an eye formed therein adapted to be slipped over a projecting portion of the bumper clamp, such as the nut 34 on the stud 31. The sets of cables 42 and 44 are crossed diagonally so that when the turnbuckles are tightened the posts are drawn firmly against the shouldered ends of the crossbar 40. The frame so formed is braced against movement longitudinally of the vehicle by forwardly extending brace rods 45 extending from the tops of each post to the respective ends of the forward support 14, the brace rods being removably fastened to the post as by means of the bolts 46 and removably fastened to the forward support by suitable removable means (not shown).

A roller bar 50, preferably comprising a rod 51 upon which are coaxially mounted a plurality of freely rotatable short lengths of pipe 52, extends between the upper portions of the posts, the roller bar comprising vertical sleeves 53 respectively embracing the upper portions of the post and slidably guiding the roller bar for vertical movement. The roller bar may be held in an elevated position as shown in Figs. 3 and 4 by means of a chain secured pin 55 passing through one of a series of vertically spaced openings 56 in the portion 26. The pin 55 may be removed to permit lowering of the roller bar to a lowered position, and held at such lower position by reinserting the pin 55 in a lower one of the openings 56, in this instance preferably passing the pin through an opening in the sleeve 53 as illustrated in Fig. 2.

A pair of springs 57 are respectively mounted at the upper ends of the posts, the upper ends of the springs being connected to brackets 58 at the tops of the posts and the lower ends of the springs being connected to eyes 59 on the sleeves 53. The springs are in repose when the roller bar is elevated, and are stretched when the roller bar is lowered, whereby the springs automatically cause the roller bar to be elevated when released.

Each end of the roller bar has a toggle associated therewith comprising an upper link 60 pivotally connected at one end to the sleeve 53 and a lower link 61 pivotally connected at one end to the post a short distance above the crossbar 40. A sleeve 62 slidably mounted on the toggle embraces the toggle joint 63 when the toggle arms are aligned and extended, the sleeve being held in position by a pin 64 mounted in the lower arm 61. The sleeve 62 may be slid upwardly to release the joint and permit the toggle to be broken, thereby permitting lowering of the roller bar. When the toggles are straightened the roller bar is held in its elevated position, with the joints 63 locked by the sleeves 62, thereby providing double security against lowering the roller bar while the boat is being transported.

The present invention is utilized by mounting the frame as described upon the vehicle with the posts adjacent the sides of the vehicle, preferably at the rear corners thereof, and securing the forward support to the vehicle top in proper position to accommodate the boat being transported. The toggles are broken and the roller bar lowered and secured at the lowered position by means of the pins 55. In this position the front end of an overturned boat may be easily raised by one man and rested upon the roller bar, the roller sections 52 being adjusted to support the bow of the boat and to engage the stern portions of the gunwales as the boat is elevated over the top of the car. A single person may then lift the stern of the boat and walk forwardly to move the boat into position, lowering the bow as it reaches a position above the forward roller 21. When the boat has been moved forwardly far enough, the stern is elevated to the level of the bow and the pins 55 released, whereupon the springs 57 will automatically elevate the roller bar to its upper position. Raising of the roller bar automatically straightens the toggles, permitting the locking sleeves 62 to drop into locking position embracing the joints of the toggles. The pins 55 may now be reinserted doubly to secure the roller bar in elevated position. The boat is then strapped or otherwise suitably secured to the carrier.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:

1. A car top boat carrier and loader comprising a frame adapted to be mounted on a vehicle, said frame comprising a pair of laterally spaced, upright posts adjacent the opposite sides of the vehicle at one end thereof, a roller bar extending between said posts, said roller bar comprising guide means at each end respectively embracing said posts and guiding vertical movement of said roller bar, means for holding said roller bar at a lowered position facilitating longitudinal movement of a boat upwardly over the top of the vehicle, means for holding the roller bar at a raised position in order to carry the boat in a horizontal position, and spring means for raising said roller bar to its raised position when said means for holding the roller bar at its lowered position is released.

2. A car top boat carrier and loader comprising a forward support adapted to be mounted upon the top of a vehicle toward its front end, a frame adapted to be mounted at the rear of the vehicle and comprising a pair of laterally spaced, upright posts respectively rising above the rear corners of the vehicle, a crossbar extending between said posts, guide means at the ends of said crossbar slidably engaging said posts to permit the raising and lowering of said crossbar, means to hold said crossbar in a lowered position facilitating longitudinal movement of a boat upwardly over the top of the vehicle, means to hold said crossbar at an upper position level with said forward support for transporting the boat in level condition, and spring means extending from the tops of said posts respectively to said guide means and placed under tension when said crossbar is lowered.

3. A car top boat carrier and loader comprising a frame adapted to be mounted on a vehicle at one end thereof, said frame comprising a pair of laterally-spaced, upright posts, a crossbar extending between said posts, said crossbar comprising a pair of vertical sleeves at its ends respectively embracing said posts, and a pair of toggles respectively connecting said sleeves to the posts, said toggles each comprising a first link pivotally connected to one of said sleeves, and a second link pivotally connected to an intermediate portion of the adjacent post.

4. A car top boat carrier and loader comprising a frame adapted to be mounted on a vehicle at one end thereof, said frame comprising a pair of laterally-spaced, upright posts, a crossbar extending between said posts, said crossbar comprising a pair of vertical sleeves at its ends respectively embracing said posts, and a pair of toggles respectively connecting said sleeves to the posts, said toggles each comprising a first link pivotally connected to one of said sleeves, a second link pivotally connected to an intermediate portion of the adjacent post, and a tubular element slidably mounted on each of said toggles and movable from a position embracing the joint thereof to lock said links in aligned position to a second position remote from said joint to permit breaking the toggle.

5. A car top boat carrier and loader comprising a frame adapted to be mounted on a vehicle at one end thereof, said frame comprising a pair of laterally-spaced, upright posts, a crossbar extending between said posts, said crossbar comprising a pair of vertical sleeves at its ends respectively embracing said posts, a pair of toggles respectively connecting said sleeves to the posts, said toggles each comprising a first link pivotally connected to one of said sleeves, a second link pivotally connected to an intermediate portion of the adjacent post, and a plurality of short tubes coaxially mounted on said crossbar to act as rollers.

6. A car top boat carrier and loader comprising a frame adapted to be mounted on a vehicle at one end thereof, said frame comprising a pair of laterally-spaced, upright posts, a crossbar extending between said posts, said crossbar comprising a pair of vertical sleeves at its ends respectively embracing said posts, a pair of toggles respectively connecting said sleeves to the posts, said toggles each comprising a first link pivotally connected to one of said sleeves, a second link pivotally connected to an intermediate portion of the adjacent post, and means for locking said toggles in straightened condition to hold said crossbar at an elevated position.

7. A car top boat carrier and loader comprising a frame adapted to be mounted on a vehicle, said frame comprising a pair of laterally spaced, upright posts adjacent the opposite sides of the vehicle at one end thereof, a roller bar extending between said posts, said roller bar comprising guide means at each end respectively embracing said posts for guiding vertical movement of said roller bar, means for holding said roller bar at a lowered position facilitating longitudinal movement of a boat upwardly over the top of the vehicle, means for holding said roller bar at a raised position in order to carry the boat in a horizontal position, and a pair of springs respectively connected between the upper end of each post and its associated guide means for elevating said roller bar from its lowered position to its raised position.

References Cited in the file of this patent

UNITED STATES PATENTS

| | | |
|---|---|---|
| 2,599,670 | Thomas | June 10, 1952 |
| 2,812,087 | Zoller | Nov. 5, 1957 |